US006771441B2

(12) United States Patent
Tang et al.

(10) Patent No.: US 6,771,441 B2
(45) Date of Patent: Aug. 3, 2004

(54) TRACK MIS-REGISTRATION MEASUREMENT FOR A DISC DRIVE

(75) Inventors: KayHee Tang, Singapore (SG); Xiong Liu, Singapore (SG); Aik Chuan Lim, Singapore (SG); Edmun C. Seng, Singapore (SG); UttHeng Kan, Singapore (SG); ChoonKiat Lim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 176 days.

(21) Appl. No.: 10/029,518

(22) Filed: Dec. 21, 2001

(65) Prior Publication Data

US 2003/0030928 A1 Feb. 13, 2003

Related U.S. Application Data

(60) Provisional application No. 60/311,113, filed on Aug. 9, 2001.

(51) Int. Cl.$^7$ .................. G11B 27/36; G11B 21/02; G11B 5/09
(52) U.S. Cl. .................. 360/31; 360/75; 360/53
(58) Field of Search .................. 360/75, 53, 31, 360/51

(56) References Cited

U.S. PATENT DOCUMENTS

| | | |
|---|---|---|
| 4,675,758 A | 6/1987 | Tanaka |
| 4,939,599 A | 7/1990 | Chainer et al. |
| 5,072,318 A | 12/1991 | Yu |
| 5,079,653 A | 1/1992 | Gauthier et al. |
| 5,402,280 A | 3/1995 | Supino |
| 5,781,360 A | 7/1998 | Wilson et al. |
| 5,793,559 A | 8/1998 | Shepherd et al. |
| 5,949,605 A | 9/1999 | Lee et al. |
| 6,088,188 A | 7/2000 | Serrano et al. |
| 6,091,568 A | 7/2000 | Gilliand |
| 6,091,576 A * | 7/2000 | Eckerd et al. ........... 360/254.8 |
| 6,097,565 A | 8/2000 | Sri-Jayantha et al. |
| 6,204,660 B1 | 3/2001 | Lee |
| 6,222,418 B1 | 4/2001 | Gopinathan et al. |
| 6,224,959 B1 | 5/2001 | Nagasaka et al. |
| 6,295,175 B1 | 9/2001 | Tomita et al. |
| 6,404,570 B1 * | 6/2002 | McNeil et al. ................ 360/31 |
| 2001/0006435 A1 | 7/2001 | Ichihara et al. |
| 2001/0006436 A1 | 7/2001 | Akiyama et al. |

* cited by examiner

*Primary Examiner*—David Hudspeth
*Assistant Examiner*—Glenda P. Rodriguez
(74) *Attorney, Agent, or Firm*—Fellers, Snider, et al.

(57) ABSTRACT

An apparatus and method of predicting functional capability of a data storage device having a plurality of information tracks, comprising performing a DC erase on three adjacent information tracks, writing a predetermined bit pattern on a middle track of the three adjacent information tracks, providing a first signal from the bit pattern to a variable gain amplifier to generate a first value of the variable gain amplifier, performing DC erases on the information tracks adjacent the middle track, reading the bit pattern from the middle track to provide a second signal to the variable gain amplifier to generate a second value of the variable gain amplifier, and operating on the first and second values of the variable gain amplifier to provide a track mis-registration value for use with a predetermined threshold value to determine the functional capability of the data storage device.

23 Claims, 4 Drawing Sheets

TRACK MIS-REGISTRATION MEASUREMENT FOR A DISC DRIVE

RELATED APPLICATIONS

This application claims priority to U.S. Provisional Application No. 60/311,113 filed Aug. 9, 2001, entitled VGA-BASED DRIVE TMR PERFORMANCE MEASUREMENT.

FIELD OF THE INVENTION

This invention relates generally to the field of magnetic data storage devices, and more particularly, but not by way of limitation, to measuring track mis-registration for a disc drive.

BACKGROUND

Disc drives are used for data storage in modern electronic products ranging from digital cameras to computer systems and networks. A typical disc drive includes a head-disc assembly (HDA) housing the mechanical portion of the drive, and a printed circuit board assembly (PCBA), attached to the head-disc assembly. The printed circuit board assembly controls operations of the head-disc assembly and provides a communication link between the head-disc assembly and a host device served by the disc drive.

Typically, the head-disc assembly has a disc with a recording surface rotated at a constant speed by a spindle motor assembly and an actuator assembly positionably controlled by a closed loop servo system. The actuator assembly supports a read/write head that writes data to and reads data from the recording surface. Disc drives using magneto resistive read/write heads typically use an inductive element, or writer, to write data to information tracks of the recording surface and a magneto resistive element, or reader, to read data from the information tracks during drive operations.

One type of data recorded to and read from the information tracks is servo data. Servo data, including a physical track identification portion (also referred to as a servo track number or physical track number), written to the recording surface define each specific physical track of a number of physical tracks written on the recording surface. A servo track writer is traditionally used in writing a predetermined number of servo tracks to each recording surface during the manufacturing process. The servo tracks are used by the closed loop servo system for controlling the position of the read/write head relative to the recording surface during disc drive operations.

High performance disc drives achieve areal bit densities in the range of several gigabits per square centimeter (Gbits/cm$^2$). Higher recording densities can be achieved by increasing the number of bits per centimeter stored along each information track, and/or by increasing the number of tracks per centimeter written across each recording surface. Capacity increases gained through increasing the bits per centimeter stored on each track generally require improvements in the read/write channel electronics to enable data to be written to and subsequently read from the recording surface at a correspondingly higher frequency. Capacity increases gained by increasing the number of tracks per centimeter on each recording surface generally require improvements in servo control systems, which enable the read/write heads to be more precisely positioned relative to the information tracks.

Concentric servo tracks written across the recording surface of the disc is the intended result of a servo write process. Each of the concentric servo tracks should be a closed circle with its center coincident with the axis of rotation of the spindle motor. The concentric servo tracks should exhibit consistent track-to-track spacing relative to each other across the surface of the disc. However, in practice, a number of factors disrupt the formation of consistent track-to-track spacing of the servo tracks during the servo write process. The resulting inconsistent track-to-track spacing is referred to as "written-in track squeeze". Written-in track squeeze is an effect caused by a relative shift in position between the read/write head and the recording surface during the servo write process at a time in the process that the servo data is being written to the recording surface. Written-in track squeeze is an important factor contributing to track mis-registration.

The amount of mis-registration of one track has a direct bearing on the ability of the read element to read data stored on an adjacent track. If the mis-registration of the first track encroaches on the adjacent track by a sufficient amount, erasure of data previously written to the adjacent track can occur when writing data to the first track. An encroachment on data previously written to a track occurring during a write operation to an adjacent track is referred to as "track squeeze." The encroachment typically takes the form of a partial overwrite of the data previously written to the track.

Ordinarily, disc drives are designed to withstand a given level of track squeeze. Disc drives that encounter track squeeze beyond design limits cease to operate properly. In establishing a track squeeze standard for the disc drive an additional margin of safety is added to the level of track squeeze the disc drive is designed to withstand. The level of track squeeze represented by the inclusion of the additional margin of safety is established as the track squeeze specification for the disc drive. During the manufacturing process disc drives that fail to meet the track squeeze specification are subjected to costly rework operations.

Since an amount of track squeeze present between adjacent tracks substantially represents the collective effect of a number of factors, during the manufacturing process each factor is typically measured against an empirically determined level of acceptability. The predominant factors causing track squeeze include: the width of the written track; the repeatable runout present in the head disc assembly; the occurrence of non-repeatable runout during a write operation; and the written-in track squeeze. In establishing the empirically determined levels of acceptability for each factor, a level of contribution to track squeeze generally caused by each factor is resolved. Based on the contribution generally caused by each factor, a threshold limit is typically established for each factor. Each threshold is ordinarily combined with an appropriate level of margin to form a level of acceptability for each factor. As each level of acceptability is essentially an acceptance level, disc drives that fail to meet the acceptance level for any of the factors are failed and undergo re-work operations.

However, because track mis-registration is a result of a complex combination of the aforementioned factors, a deficiency in one factor can be compensated by an improved robustness of one or more of the other factors. For example, a disc drive may exhibit a track width greater than the acceptance level width, while at the same time having minimal written-in track squeeze, a small amount of repeatable runout and an acceptable margin for non-repeatable runout. Currently, even though the collective effect of the factors may result in a track squeeze condition that is within the disc drive track squeeze specification, disc drives are failed and subjected to costly re-work because one of the individual factors, taken alone, fails to meet its individual level of acceptability.

Therefore, challenges remain and needs persist for means of measuring the collective result of the combination of factors contributing to track mis-registration for use in determining disc drives having a sufficient level of track squeeze margin for proper functionality, even though one or more of the contributing factors fall outside an empirically determined level of acceptability. It is to this and other features and advantages set forth herein that embodiments of the present invention are directed.

SUMMARY OF THE INVENTION

As exemplified by preferred embodiments, the present invention provides for measuring track mis-registration operating performance of a data storage device with a plurality of information tracks for use in predicting proper operation of the data storage device. Track mis-registration is measured by performing DC erasures on three adjacent information tracks selected from the plurality of information tracks. Next, a predetermined bit pattern is written on a middle track of the three adjacent information tracks, which is read to provide a first signal to a variable gain amplifier to generate a first value of the variable gain amplifier. Then, DC erasures are again performed on the information tracks adjacent the middle track, and the predetermined bit pattern is reread from the middle track to provide a second signal to the variable gain amplifier to generate a second value of the variable gain amplifier. The first and second values of the variable gain amplifier are compared to provide a track mis-registration value for use with a predetermined threshold value to determine the functional capability of the data storage device.

These and various other features and advantages, which characterize the present invention, will be apparent from a reading of the following detailed description and a review of the associated drawings.

DETAILED DESCRIPTION

Figure 1:
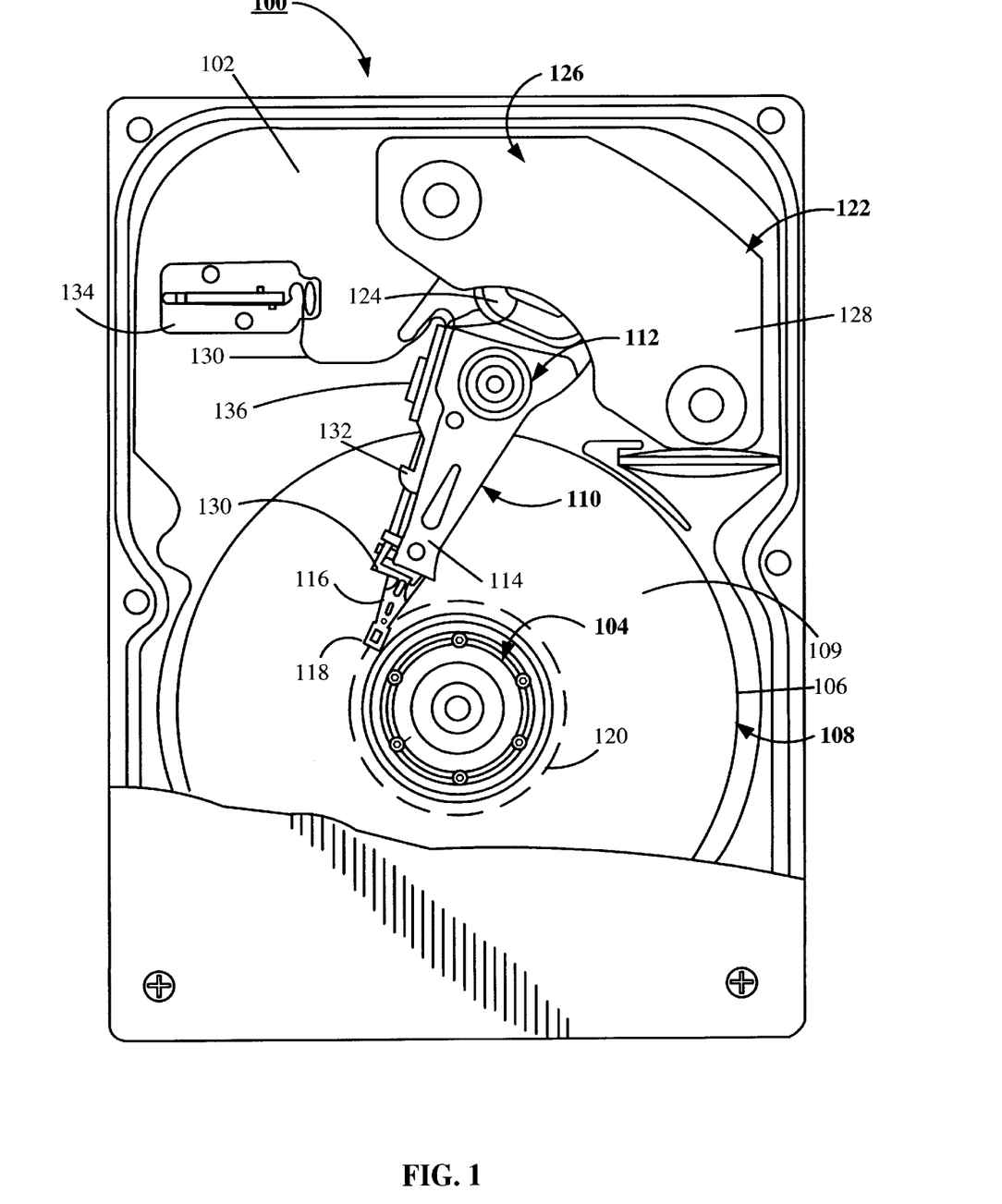
FIG. 1 is a top plan view of a disc drive with an amount of available read margin determined in accordance with a method of the present invention to operate the disc drive.

Referring to the drawings in general, and more particularly to FIG. 1, shown therein is a top view of a disc drive 100, also referred to herein as a data storage device, constructed in accordance with the present invention. Numerous details of and variations for the construction of the disc drive 100 are not included in the following description as such are well-known to those skilled in the art, and believed unnecessary for the purpose of describing the present invention.

The disc drive 100 includes a basedeck 102 supporting various data storage device components, including a spindle motor assembly 104 that supports one or more axially aligned rotatable discs 106 forming a disc stack 108, each disc 106 having at least one, and usually two, recording surfaces 109.

Adjacent the disc stack 108 is a head stack assembly 110 (also referred to as an actuator assembly) which pivots about a bearing assembly 112 in a rotary fashion. The head stack assembly 110 includes an actuator arm 114 that supports a load arm 116, which in turn supports at a read/write head 118 corresponding to the rotatable recording surface 109. The rotatable recording surface 109 is divided into concentric information tracks 120 (only one depicted) over which the read/write head 118 is positionably located. The information tracks 120 support head position control information written to embedded servo sectors (not separately depicted). Between the embedded servo sectors are data sectors (not separately depicted) used for storing bit patterns or data. The read/write head 118 includes a reader element (not separately shown) offset radially and laterally from a writer element (not separately shown). The writer element writes data to the concentric information tracks 120 during write operations of the disc drive 100, while the reader element controls the positioning of the read/write head 118 relative to the concentric information tracks 120 during operations of the disc drives 100.

The terms "servoing" and "position-controlling," as used herein, mean maintaining control of the read/write head 118 relative to the rotating recording surfaces 109 during operation of the disc drive 100. Servoing to or on the information track 120, the head stack assembly 110 is controllably positioned by a voice coil motor assembly 122 (also referred to a primary actuator motor). The voice coil motor assembly 122 includes an actuator coil 124 immersed in a magnetic field generated by a magnet assembly 126. A pair of steel plates 128 (pole pieces) mounted above and below the actuator coil 124 provides a magnetically permeable flux path for a magnetic circuit of the voice coil motor 122. During operation of the disc drive 100, current passes through the actuator coil 124 forming an electromagnetic field, which interacts with the magnetic circuit of the voice coil motor 122, causing the actuator coil 124 to move relative to the magnet assembly 126. As the actuator coil 124 moves, the head stack assembly 110 pivots about the bearing assembly 112, causing the read/write head 118 to move over the rotatable recording surface 109, thereby allowing the read/write head 118 to interact with the information tracks 120 of the recording surfaces 109.

To provide the requisite electrical conduction paths between the read/write head 118 and data storage device read/write circuitry (not shown), read/write head wires (not shown) of the read/write head 118 are affixed to a read/write flex circuit 130. The read/write flex circuit 130 is routed from the load arms 116 along the actuator arms 114 and into a flex circuit containment channel 132 and secured to a flex connector body 134. The flex connector body 134 supports the flex circuit 130 during passage through the basedeck 102 and into electrical communication with a printed circuit board assembly (PCBA) (not shown) mounted to the underside of the basedeck 102. The flex circuit containment channel 132 also supports read/write signal circuitry including preamplifier/driver (preamp) 136 used to condition read/write signals passed between the read/write circuitry and the read/write head 118. The printed circuit board assembly provides the data storage device read/write circuitry that controls the operation of the read/write head 118, as well as other interface and control circuitry for the disc drive 100.

Figure 2:
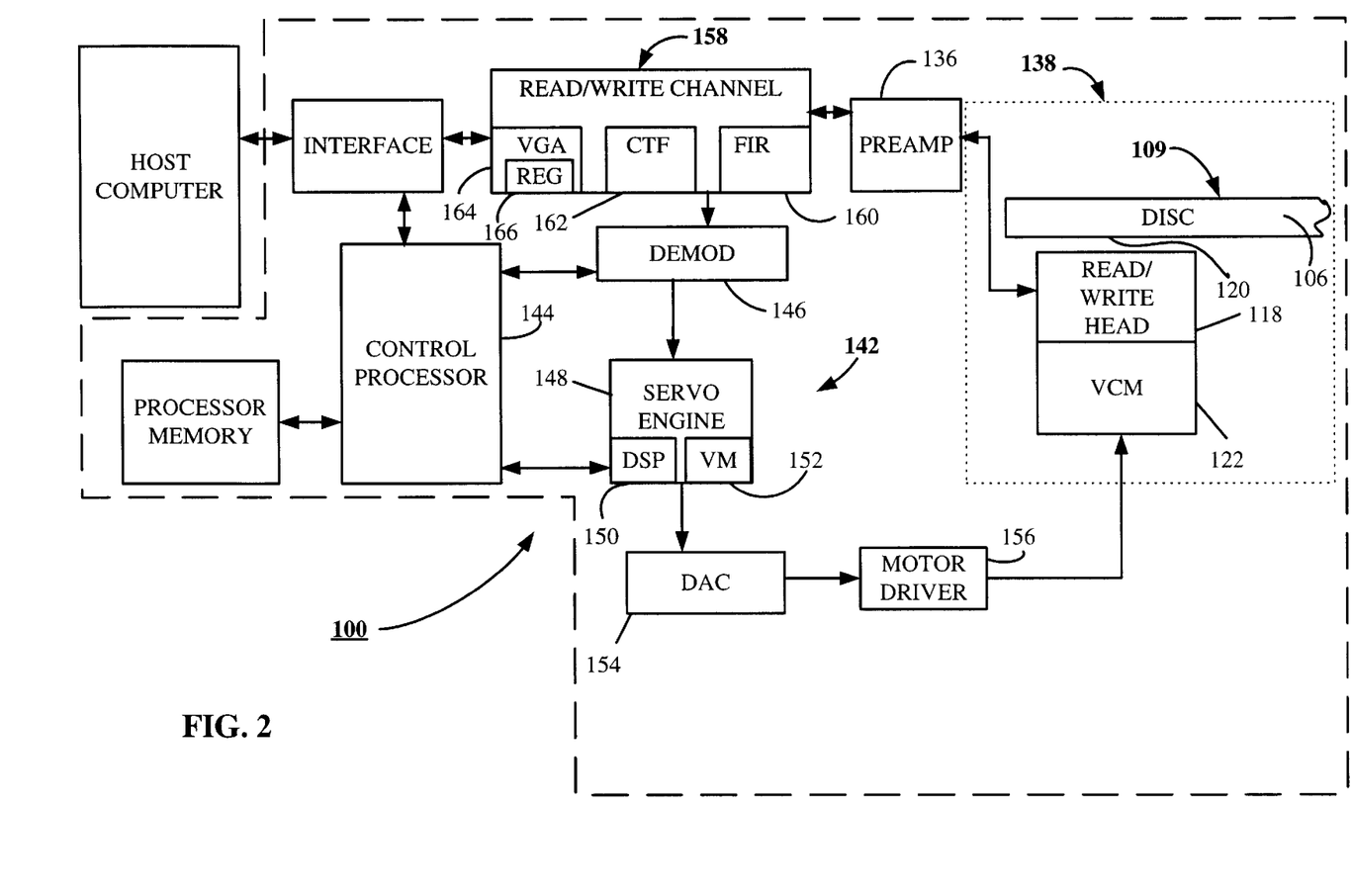
FIG. 2 is a functional block diagram of control circuitry of the disc drive of FIG. 1.

Turning to FIG. 2, position-controlling of the read/write head 118 is provided by the positioning mechanism (not separately shown) operating under the control of a servo control circuit 142 programmed with servo control code, which forms the servo control loop. The servo control circuit 142 includes a control processor 144, a demodulator (demod) 146, an application specific integrated circuit (ASIC) hardware-based servo controller ("servo engine") 148, a digital signal processor (DSP)150, a volatile memory (VM) 152, a digital to analog converter (DAC) 154 and a motor driver circuit 156. Optionally, the functions of the servo engine 148, the digital signal processor 150 and the volatile memory 152 may all be contained within the control processor 144. The components of the control circuit 142 are utilized to facilitate track following algorithms for the head stack assembly 110 (of FIG. 1) and more specifically for controlling the voice coil motor 122 in position-controlling the read/write head 118 relative to the selected information track 120 (of FIG. 1).

The demodulator 146 conditions head position control information transduced from the information track 120 of the rotatable recording surface 109 to provide position information of the read/write head 118 relative to the information track 120. The servo engine 148 generates servo control loop values used by the control processor 144 in generating command signals such as seek signals used by voice coil motor 122 in executing seek commands. Control loop values are also used to maintain a predetermined position of the head stack assembly 110 during data transfer operations. The command signals generated by the control processor 144 are converted by the digital to analog converter 154 to analog control signals. The analog control signals are used by the motor driver circuit 156 in position-controlling the read/write head 118 relative to the selected information track 120, during track following, and relative to the recording surface 109 during seek functions.

The read element of the read/write head 118 responds to bit patterns written to the servo sectors as well as bit patterns written to the data sectors of the information track 120 by generating a signal, also referred to as a read signal. The signal is passed to the preamplifier 136, where the amplitude of the signal is increased and then passed to the read/write channel 158. Within the read/write channel 158 the signal is operated on by a finite impulse response filter (FIR) 160 and a continuous time filter (CTF) 162 prior to being processed by a variable gain amplifier (VGA) 164.

Filters are, in general, devices that exhibit a frequency-selective behavior. Filters operate on the signal by changing or suppressing amplitudes of frequency components of the signal. For the continuous time filter 162, the spectrum of an output signal is that of an input signal multiplied by the frequency response of the system. The finite impulse response filter 160 produces an output signal that is the weighted sum of the current and past input signals received from the preamplifier 136.

The variable gain amplifier 164 is an inversely proportional linear device that responds to the amplitude of the signal processed by the finite impulse response filter 160 and the continuous time filter 162. The variable gain amplifier 164 operates by increasing, by a predetermined level, the amplitude of the signal. The amount of increase applied is based on the amplitude of the signal received by the variable gain amplifier 164. When the amplitude of the signal is at or above a predetermined level, the variable gain amplifier 164 to the signal applies no gain, and an eight-bit value (not depicted separately) within a register (REG) 166 of the variable gain amplifier reflects a zero count. A zero count means that the signal needed no additional gain and none had been applied. However, when an eight-bit value within the register 166 reflects a count of 255 it means that the highest gain the variable gain amplifier 164 is capable of applying to the signal has been applied to the signal.

A feature of an embodiment of the present invention is a method for performing track mis-registration screening of the disc drive 100 during the manufacturing process. The method uses the eight-bit value of the register 166 of the variable gain amplifier 164 in conjunction with a series of read and erase operations performed on a selected test track (not separately depicted) as a basis for the screen. The method inherently measures a combined effect of disturbances on the disc drive 100 and attributes of the disc drive 100 that cause track mis-registration between adjacent information tracks 120 on the recording surface 109. The attributes include a width of the written test track and the quality of the read/write channel 158. The disturbances include non-repeatable runout (NRRO) occurring during a write operation, written-in repeatable runout (RRO), and written-in track squeeze. The combinations of these disturbances and attributes of the disc drive 100 represent the major portion of track mis-registration, which is also referred to herein as track squeeze, experienced by the disc drive 100.

Figure 3:
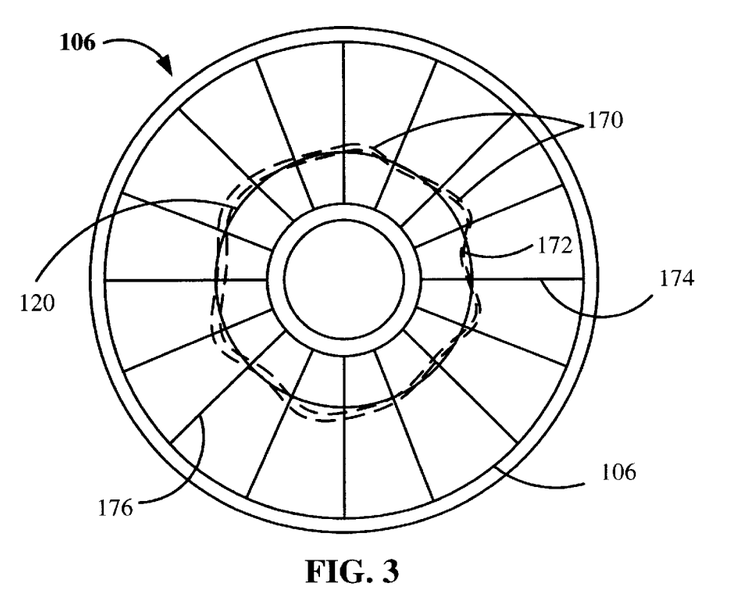
FIG. 3 is a diagrammatic illustration of a method of determining an amount of available read margin for an information track of the disc drive of FIG. 1.

FIG. 3 depicts a top view of the disc 106 providing the recording surface 109 with a pair of erratic and distorted circular shaped servo tracks 170 (depicted as dashed lines) of a plurality of servo tracks 170. Also depicted by FIG. 3 is a region 172 where the pair of servo tracks 170 are in very close proximity to each other causing "AC track squeeze," also referred to as written-in track squeeze. AC track squeeze is a byproduct of the servo write process. It results as a consequence of either misalignment of the write element of the read/write head 118 relative to the recording surface 109 or misalignment of the recording surface 109 relative to the write element of the read/write head 118 during the servo write process.

Each information track 120 of a plurality of information tracks 120 is associated with a specific servo track 170 of the plurality of servo tracks 170. The recording surface 109 further includes a plurality of adjacent, radially extending position information fields 174, also known as servo sectors 174. Each servo sector 174 includes track identification bits 176 and servo position bits 178 (not separately depicted). The track identification bits 176 define the servo track 170 associated with a specific information track 120. The track identification bits 176 are accessed by a selected read/write head 118 when the disc drive 100 executes a seek request. The servo position bits 178 are read and used to determine the location of the selected read/write head 118 relative to a track center of the servo sector 174 of the selected servo track 170. Any variation in the position of the read/write head 118 away from circular track 120 is considered a position error.

The regions of servo tracks 170 that do not substantially comply with the geometric shape of the information track 120, when followed by the read/write head 118 during track following generate repeatable runout errors. The regions of servo tracks 170 that do not substantially comply with the geometric shape of the information track 120 were written into the servo tracks 170, during the servo write process and become written in repeatable runout errors.

The sources of the written in repeatable runout errors are disturbances occurring during the servo write process. Servo write process disturbances can shift the read/write head 118 away from a desired position relative to the disc surface 109 or they can cause a shift in the disc surface 109 away from the desired position relative to the read/write head 118.

A number of the repeatable runout errors written into a particular servo track 170 may have been caused by a non-repeatable disturbance, which occurred during the servo write process. Non-repeatable disturbances cause the shape irregularity that differs from servo track 170 to servo track 170 across the disc surface 109 as depicted in FIG. 3. The differences in shape irregularity between adjacent servo tracks 170 results in a mismatch in geometric shape between adjacent servo tracks 170. The mismatch in geometric shape between adjacent servo tracks 170 leads to a reduction in space between the track centers of the adjacent servo tracks 170. This reduction in space between the track centers of the adjacent tracks 170 is referred to as track squeeze and is depicted at sign number 172.

If the geometric shape of a selected servo track 170 is followed during a data write operation, data written to the data track 120 associated with the selected servo track 170 may impinge, disrupt or even overwrite data written on a data track adjacent the data track 120. The result of writing data to the data track 120, following the geometric shape of a selected servo track 170 is a "squeezing" of the usable width of the information track adjacent the data track 120, diminishing the ability of the adjacent track to store data.

A second set of written-in repeatable runout errors present in the servo track 170 results from "operating or synchronous disturbances." Sources of operating or synchronous disturbances include disc slip, variation of spindle imbalance or disc flutter. Written in synchronous repeatable runout errors result from disturbances that occur in synchronization with the rotation of the disc pack 108 while writing the servo sectors 174 during the servo write process. Presence of operating repeatable runout errors in synchronization with the rotation of the disc pack 108 during the servo write process results in irregularly shaped servo tracks 170 that have a substantially similar geometric shape from servo track 170 to servo track 170 across the disc surface 109. As such, synchronous repeatable runout errors tend not to contribute to written-in track squeeze 172, but do contribute to track mis-registration.

Returning to FIG. 2, the eight-bit value read from the register 166 of the variable gain amplifier 164 of the read/write channel 158 reflects the amount of gain applied to the signal. The eight-bit value represents the number of counts, or increments of gain, applied by the variable gain amplifier 164 to the signal. The total amount of gain available from the variable gain amplifier 164 is divided into 255 increments of gain, each gain increment is designated as a count. An eight-bit value representing a "0" count means the amplitude of the signal is sufficiently strong and an application of additional gain by the variable gain amplifier 164 to boost the signal is not required. A maximum count of 255 represents the maximum amount of gain the variable gain amplifier 164 has available for application to the signal.

The amount of gain applied to a signal depends on the strength of the signal. The weaker the signal, the greater the amount of gain applied by the variable gain amplifier 164 to the signal. The greater the amount of gain needed by the signal, the greater the number of increments of gain the variable gain amplifier 164 will use to boost the signal. The greater the number of gain increments used by the variable gain amplifier 164, the higher the count. The higher the count, the higher the eight-bit value of the register 166. The stronger the signal processed by the variable gain amplifier 164, the lower the count, and hence the lower the eight-bit value of the register 166.

The read/write head 118 obtains a maximum amplitude signal when the write width of the information track 120 is much greater than the read width of the information track 120. When the write width of the information track 120 narrows below the read width of the read/write head 118, the maximum amplitude signal is degraded. Based on the amount of signal degradation, the variable gain amplifier 164 applies a gain to the signal to boost the amplitude of the signal to a predetermined level. The eight-bit value of the register 166 of the variable gain amplifier increases in value in proportion to the amount of gain applied by the variable gain amplifier 164 to the signal. A narrowing of the write width of the information track 120 is typically a result of adjacent track erasure caused by factors such as non-repeatable runout, written-in repeatable runout, written-in track squeeze, or external vibration experienced by the disc drive 100 while executing a data read operation.

A basic requirement for the disc drive 100 is to write data to and read from the recording surface 109 despite a presence of track squeeze, provided the amount of track squeeze present is within a predetermined level of acceptability. The predetermined level of track squeeze represents an acceptable upper limit of the cumulative effects from non-repeatable runout, written-in repeatable runout, written-in track squeeze, narrow write width or external vibration. If the collective result of the above factors produces a track squeeze condition within the disc drive 100, greater than the acceptable upper limit of track squeeze, the disc drive 100 will have an insufficient operating margin. In the context of a disc drive 100, an operating margin can be thought of as a small amount of reserved capacity the disc drive has to deal with changing conditions encountered by the disc drive 100 over the operating life of the disc drive 100.

As disclosed above, the variable gain amplifier 164 is an inversely proportional linear device that responds to the amplitude of the signal processed by the finite impulse response filter 160 and the continuous time filter 162. The amplitude of the signal generated by the read/write head 118 reading bit patterns stored on the information track 120 is reduced when the write width is reduced.

To determine the availability of operating margin of the disc drive 100, a total track mis-registration measurement is taken on each disc drive 100 during the manufacturing process. The track mis-registration measurement utilizes a comparison of readings of the eight-bit value of the register 166 of the variable gain amplifier 164. The readings of the register 166 reflect an amount of gain applied to a read signal provided by the read/write head 118 under two conditions. Under the first condition, the predetermined bit pattern is free from adjacent track erasure. Under the second condition, the predetermined bit pattern has undergone a controlled level of adjacent track erasure.

The first reading of the register 166 reflects an amount of gain applied to a signal read from a selected test track with the predetermined bit pattern intact. The second reading of the register 166 reflects an amount of gain applied to a signal read from the selected test track following a controlled erasure of the test track. A change in value between the first and second reading provides the basis for determining an amount of operational margin available for the disc drive 100 to operate in light of the cumulative effects from non-repeatable runout, written-in repeatable runout, written-in track squeeze, narrow write width or external vibration.

The value resulting from the change in value, between the selected test track absent erasure and the selected test track exposed to erasure, is referred to as a track mis-registration value, it is also referred to as a delta VGA. Translating the track mis-registration value into an amount of track squeeze and comparing that amount of track squeeze to a predetermined level of acceptable track squeeze provides a basis for determining the functional capability of the disc drive 100.

Figure 4:
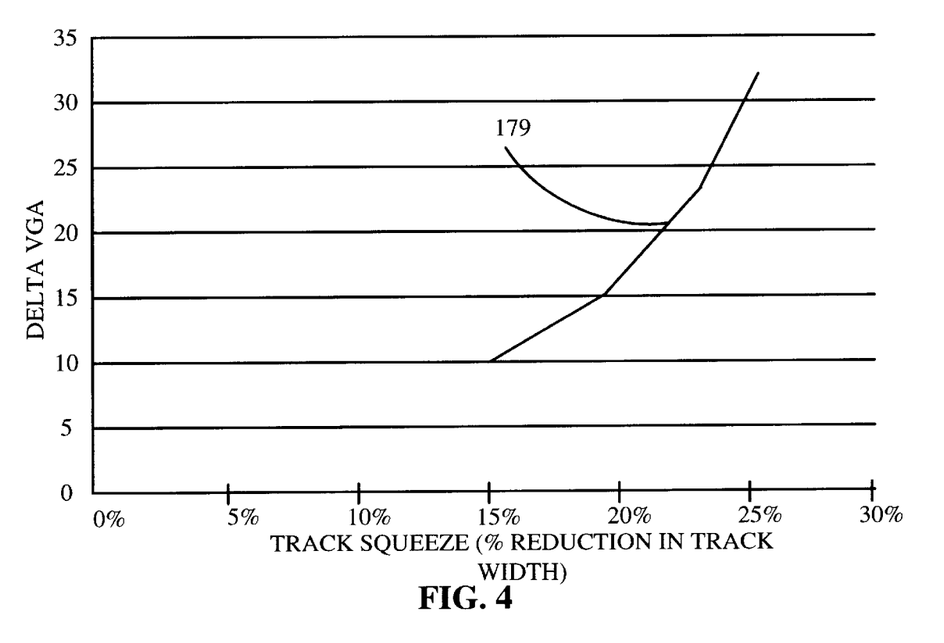
FIG. 4 is a graphical representation of a track mis-registration to track squeeze conversion curve for the disc drive of FIG. 1.

FIG. 4 depicts a typical conversion curve 179 for use in translating between track mis-registration values and a corresponding track squeeze. Track squeeze is expressed as a percentage of reduction in the width of the selected test track. The percentage of reduction in track width of the selected test track is directly proportional to a reduction in amplitude of the signal. It is noted that the conversion curve 179 is not necessarily common between different types of disc drives 100.

There are two primary factors influencing the derivation of the conversion curve 179. The first factor is the maximum gain the variable gain amplifier 164 (of FIG. 2) is capable of providing. The second factor is a comparison of the write width of the information track 120 to the read width of the read element of the read/write head 118. The wider the write width, in comparison to the read width, the less susceptible the information track 120 is to track mis-registration.

Figure 5:
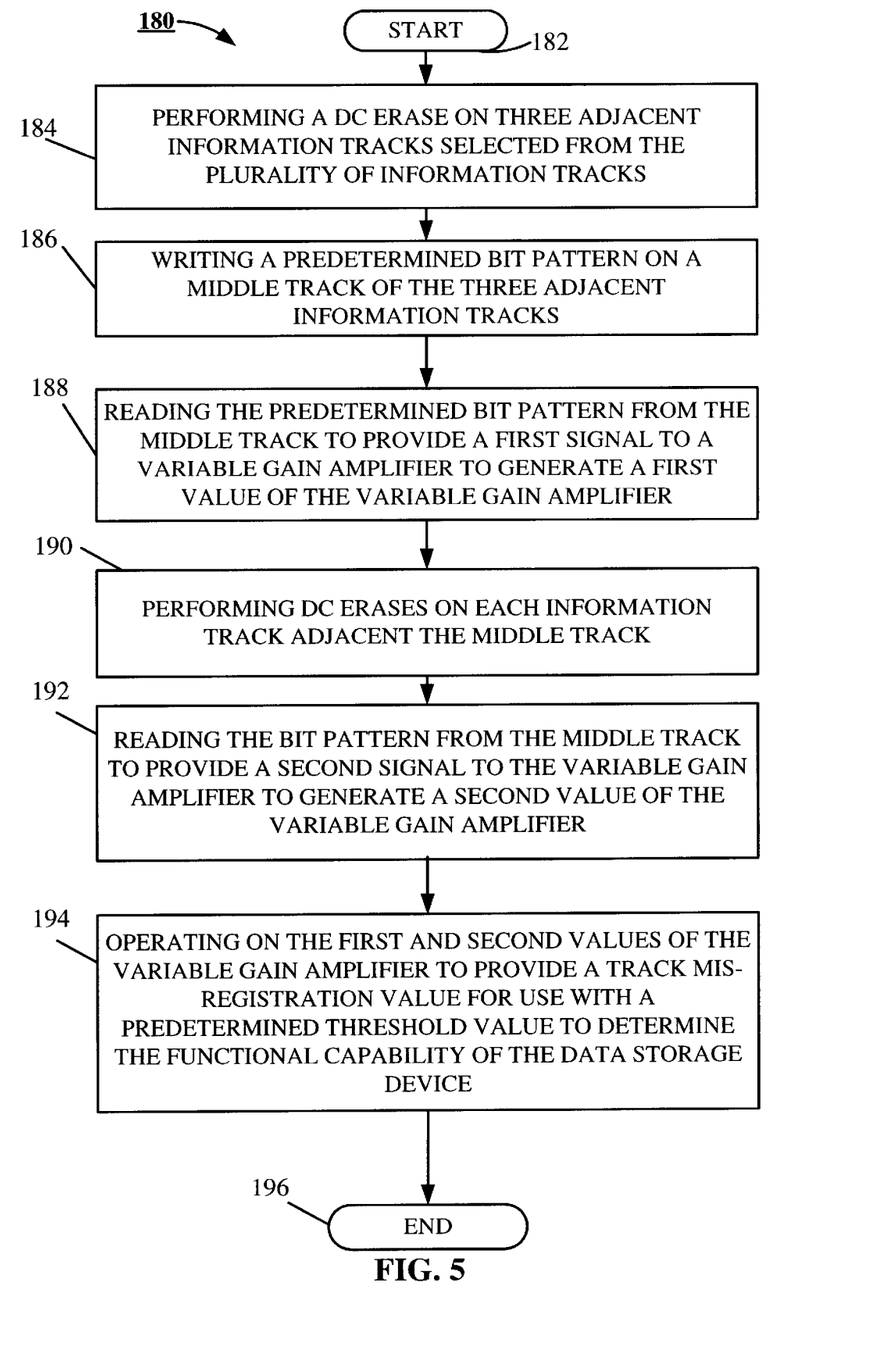
FIG. 5 is a flow chart of a method used in measuring a track mis-registration operating performance for use in predicting a functional ability of the disc drive of FIG. 1.

FIG. 5 depicts a track mis-registration screening process 180 for measuring a track mis-registration operating performance of a disc drive (such as 100) for use in predicting the functional capability of the data storage device beginning at start process step 182. The track mis-registration screening process 180 continues at process step 184 where a DC erase is performed on three adjacent information tracks (such as 120) selected from the plurality of information tracks.

In a preferred embodiment, a DC erase is executed by disabling a fault report function of a preamplifier (such as 136) to overcome fault logic of the disc drive, and by performing a wedge-to-wedge write over each of the three selected tracks. The term wedge-to wedge write means performing a constant data write operation between adjacent servo sectors (such as 170) using data bits of one type, either all "1's" or all "0's"; or, in other words, applying a constant current to the write element of a read/write head (such as 118) during the entire wedge-to-wedge write operation.

Following the erasure of the three tracks, the process continues at process step 186 with a writing of a predetermined bit pattern on a middle track of the three adjacent information tracks. The predetermined bit pattern is read in process step 188 to provide a first signal to a variable gain amplifier (such as 164). The variable gain amplifier determines and applies an amount of gain to the first signal based on signal strength of the first signal. The number of counts of gain applied to the first signal is the amount of gain applied to the first signal. The variable gain amplifier determines an eight-bit value as a first value, which represents the number of counts of gain applied to the first signal. The first value is initially held in a register (such as 166) of the variable gain amplifier, and then read from the register and stored for future use.

In a preferred embodiment, the predetermined bit pattern written on the test track is a 2T pattern (10101010 encoded), where T is the bit cell length of a signal prior to encoding and is an inverse number of the data rate. The region for writing the predetermined bit pattern is identified as being between a pair of servo sectors (such as 174), and the region between the pair of servo sectors is written with the predetermined bit pattern. Writing a super-sector to the identified region, or operating in a wedge write mode are techniques that may be used. Either technique fills the available data storage space between adjacent servo sectors.

In process step 190, a write element of a read/write head (such as 118) is offset a predetermined distance from a track center of a first of the pair of information tracks adjacent the test track. The offset, of the write element away from the track center of the first of the pair of information tracks, is made in a direction toward the middle track. With the write element offset toward the middle track, a second DC erase procedure is performed. Then the read/write head is realigned a predetermined distance from a track center of a second of the pair of information tracks adjacent the middle track. The direction of the offset of the write element from the track center of the second of the pair of information tracks is made in a direction toward the middle track. With the write element offset from the track center of the second of the pair of information tracks, and in the direction of the middle track, a third DC erase procedure is performed.

Following the second and third DC erase, the predetermined bit pattern written to the test track in process step 186 is re-read at process step 192 to provide a second signal to the variable gain amplifier. The variable gain amplifier determines and applies an amount of gain to the second signal based on signal strength of the second signal. The number of counts of gain applied to the second signal is the amount of gain applied to the second signal. The variable gain amplifier determines an eight-bit value as a second value, which represents the number of counts of gain applied to the second signal.

In process step 194, operating on the first and second values of the variable gain amplifier to provide a track mis-registration value is accomplished, the track mis-registration value is used with an empirically predetermined threshold value to determine the functional capability of the data storage device. The difference between the second value and the first value is calculated to provide the track mis-registration value. Following process step 194, the track mis-registration screening process 180 concludes at end process step 196.

Accordingly, the present invention is directed to a method for measuring a track mis-registration operating performance of a disc drive (such as 100) for use in predicting a functional capability of the disc drive. In accordance with one embodiment, steps of performing a DC erase on three adjacent information tracks selected from the plurality of information tracks (such as step 184), writing a predetermined bit pattern on a middle track of the three adjacent information tracks (such as step 186), reading the predetermined bit pattern from the middle track to provide a first signal to a variable gain amplifier to generate a first value of the variable gain amplifier (such as 188), performing DC erases on each information track adjacent the middle track (such as step 190), reading the bit pattern from the middle track to provide a second signal to the variable gain amplifier to generate a second value of the variable gain amplifier (such as step 192), and operating on the first and second values of the variable gain amplifier to provide a track mis-registration value for use with a predetermined threshold value to determine the functional capability of the data storage device (such as step 194) are accomplished to determine a functional capability of the disc drive to assure an amount of available read margin for the information track is present to support operations of the data storage device.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method for measuring a track mis-registration operating performance of a data storage device with a plurality of information tracks for use in predicting a functional capability of the data storage device comprising steps of:

(a) performing a DC erase on three adjacent information tracks selected from the plurality of information tracks;

(b) writing a predetermined bit pattern on a middle track of the three adjacent information tracks;

(c) reading the predetermined bit pattern from the middle track to provide a first signal to a variable gain amplifier to generate a first value of the variable gain amplifier;

(d) performing DC erases on each information track adjacent the middle track;

(e) re-reading the bit pattern from the middle track to provide a second signal to the variable gain amplifier to generate a second value of the variable gain amplifier; and (f) operating on the first and second values of the variable gain amplifier to provide a track mis-registration value for use with a predetermined threshold value to determine the functional capability of the data storage device.

2. The method of claim 1, in which the data storage device includes a read/write channel, and in which the functional capability of the data storage device is determined by an amount of remaining read margin of the middle track following the DC erase of performing step (d), wherein the read margin of the middle track is an amount of signal amplitude above a minimum amount of signal amplitude used by the read/write channel to correctly interpret the predetermined bit pattern read from the middle track.

3. The method of claim 1, in which the writing step (b) comprises steps of:

(h1) identifying a region of the middle track between a pair of servo sectors of the middle track; and (b2) writing the predetermined bit pattern to the identified region.

4. The method of claim 3, in which the identified region of writing step (b2) includes substantially the entire middle track between the pair of servo sectors.

5. The method of claim 3, in which the bit pattern of writing step (b2) is a 2T pattern.

6. The method of claim 1, in which the reading step (c) comprises steps of:

(c1) maintaining a set of adaptive parameters in a continuous time filter of a read/write channel fixed while reading the predetermined bit pattern and passing the first signal through the continuous time filter to the variable gain amplifier;

(c2) bypassing a finite impulse response filter of the read/write channel with the first signal while passing the first signal to the variable gain amplifier;

(c3) providing an amplitude of the first signal of the bit pattern read from the middle track to the variable gain amplifier; and (c4) generating the first value as a first eight-bit value based on the amplitude of the first signal of the bit pattern, the first eight-bit value determining an amount of gain applied to the amplitude of the first signal.

7. The method of claim 6, in which the first eight-bit value of generating step (c4) is inversely proportional to the amplitude of the bit pattern.

8. The method of claim 6, in which the operating step (f) comprises steps of:

(f1) determining a difference between the second value of the variable gain amplifier and the first value of the variable gain amplifier to provide the track mis-registration value;

(f2) translating the track mis-registration value to an amount of track squeeze experienced by the middle track; and (f3) comparing the amount of track squeeze experienced by the middle track to a predetermined level of acceptable track squeeze.

9. The method of claim 8, in which the amount of track squeeze of translating step (f2) is expressed as a percent loss in the amplitude of the bit pattern read from the middle track of providing step (c3) resulting from the DC erase of performing step (d).

10. The method of claim 1, in which the performing step (d) comprises steps of:

(d1) selecting a first information adjacent the middle track;

(d2) aligning a write element of a read/write head with a track center of the first information track;

(d3) offsetting the write element toward the middle track by a predetermined distance from the track center of the first information track;

(d4) performing a DC erase on the first information track;

(d5) re-aligning the write element of a read/write head with a track center of a second information track adjacent the middle track;

(d6) offsetting the write element toward the middle track by a predetermined distance from the track center of the second information track; and (d7) accomplishing a DC erase on the second information track.

11. The method of claim 1, in which the re-reading step (e) comprises steps of:

(e1) maintaining a set of adaptive parameters in a continuous time filter of a read/write channel fixed while re-reading the predetermined bit pattern and passing the second signal through the continuous time filter to the variable gain amplifier;

(e2) bypassing a finite impulse response filter of the read/write channel with the second signal while passing the second signal to the variable gain amplifier;

(e3) providing an amplitude of the second signal of the bit pattern re-read from the middle track to the variable gain amplifier; and (e4) generating the second value as a second eight-bit value based on the amplitude of the second signal of the bit pattern re-read from the middle track, the second eight-bit value signifying an amount of gain applied to the amplitude of the second signal of the bit pattern.

12. The method of claim 11, in which the second eight-bit value of generating step (e4) is inversely proportional to the amplitude of the bit pattern.

13. The method of claim 1, in which the operating step (f) comprises steps of:

(f1) determining a difference between the second generated value and the first generated value to provide the track mis-registration value;

(f2) translating the track mis-registration value to an amount of track squeeze experienced by the middle track; and (f3) comparing the amount of track squeeze experienced by the middle track to a predetermined level of acceptable track squeeze.

14. A data storage device comprising:

a basedeck supporting a spindle motor assembly;

a recording surface with an information track attached to the spindle motor assembly, the information track being for data storage;

an actuator assembly supported by the basedeck and having a read/write head rotationally positionable adjacent the recording surface, the read/write head comprising a read element for reading data from the information track and a write element for writing data to the information track; and an amount of available read margin for the information track to support operation of the data storage device determined by steps for measuring a track mis-registration operating performance of the data storage device.

15. The data storage device of claim 14, in which the steps for measuring a track mis-registration operating performance of the data storage device comprises steps of:

(a) performing a DC erase on three adjacent information tracks selected from the plurality of information tracks;

(b) writing a predetermined bit pattern on a middle track of the three adjacent information tracks;

(c) reading the predetermined bit pattern from the middle track to provide a first signal to a variable gain amplifier to generate a first value of the variable gain amplifier;

(d) performing a second DC erase on each information track adjacent the middle track;

(e) re-reading the bit pattern of step (b) to provide a second signal to the variable gain amplifier to generate a second value of the variable gain amplifier; and (f) operating on the first and second values of the variable gain amplifier to provide a track mis-registration value for use with a predetermined threshold value to determine the functional capability of the data storage device.

16. The data storage device of claim 15, in which the data storage device includes a read/write channel, and in which the functional capability of the data storage device is determined by an amount of remaining read margin of the middle track following the DC erase of performing step (d), wherein the read margin of the middle track is an amount of signal amplitude above a minimum amount of signal amplitude used by the read/write channel to correctly interpret the predetermined bit pattern read from the middle track.

17. The data storage device of claim 15, in which the writing step (b) comprises steps of:

(b1) identifying a region of the middle track between a pair of servo sectors of the middle track; and (b2) writing the predetermined bit pattern to the identified region.

18. The data storage device of claim 15, in which the reading step (c) comprises steps of:

(c1) maintaining a set of adaptive parameters in a continuous time filter of a read/write channel fixed while reading the predetermined bit pattern and passing the first signal through the continuous time filter to the variable gain amplifier;

(c2) bypassing a finite impulse response filter of the read/write channel with the first signal while passing the first signal to the variable gain amplifier;

(c3) providing an amplitude of the first signal of the bit pattern read from the middle track to the variable gain amplifier; and (c4) generating the first value as a first eight-bit value based on the amplitude of the first signal of the bit pattern, the first eight-bit value determining an amount of gain applied to the amplitude of the first signal.

19. The data storage device of claim 15, in which the performing step (d) comprises steps of:

(d1) selecting a first information track adjacent the middle track;

(d2) aligning a write element of a read/write head with a track center of the first information track;

(d3) offsetting the write element toward the middle track by a predetermined distance from the track center of the first information track;

(d4) performing a DC erase on the first information track;

(d5) re-aligning the write element of a read/write head with a track center of a second information track adjacent the middle track;

(d6) offsetting the write element toward the middle track by a predetermined distance from the track center of the second information track; and (d7) accomplishing a DC erase on the second information track.

20. The data storage device of claim 15, in which the re-reading step (e) comprises steps of:

(e1) maintaining a set of adaptive parameters in a continuous time filter of a read/write channel fixed while re-reading the predetermined bit pattern and passing the second signal through the continuous time filter to the variable gain amplifier;

(e2) bypassing a finite impulse response filter of the read/write channel with the second signal while passing the second signal to the variable gain amplifier;

(e3) providing an amplitude of the second signal of the bit pattern re-read from the middle track to the variable gain amplifier; and (e4) generating the second value as a second eight-bit value based on the amplitude of the second signal of the bit pattern re-read from the middle track, the second eight-bit value signifying an amount of gain applied to the amplitude of the second signal of the bit pattern.

21. The data storage device of claim 15, in which the reading step (c) comprises steps of:

(c1) maintaining a set of adaptive parameters in a continuous time filter of a read/write channel fixed while reading the predetermined bit pattern and passing the first signal through the continuous time filter to the variable gain amplifier;

(c2) bypassing a finite impulse response filter of the read/write channel with the first signal while passing the first signal to the variable gain amplifier;

(c3) providing an amplitude of the first signal of the bit pattern read from the middle track to the variable gain amplifier; and (c4) generating the first value as a first eight-bit value based on the amplitude of the first signal of the bit pattern, the first eight-bit value determining an amount of gain applied to the amplitude of the first signal, and in which the operating step (f) comprises steps of:

(f1) determining a difference between the second generated value and the first generated value to provide the track mis-registration value;

(f2) translating the track mis-registration value to an amount of track squeeze experienced by the middle track; and (f3) comparing the amount of track squeeze experienced by the middle track to a predetermined level of acceptable track squeeze, and further in which the amount of track squeeze of translating step (f2) is expressed as a percent loss in the amplitude of the bit pattern read from the middle track of providing step (c3) resulting from the DC erase of performing step (d).

22. A method for measuring a data track mis-registration operating performance of the data storage device by steps comprising:

reading a first value from a variable gain amplifier reflective of an amount of gain applied to a signal read from a selected test track with an intact predetermined bit pattern written thereon;

reading a second value from the variable gain amplifier reflective of an amount of gain applied to a second signal read from the selected test track following a controlled erasure of the selected test track; and comparing a change in value between the first and second reading to determine an amount of available operational margin.

23. A data storage device comprising:

a rotatable recording surface with a selected test track storing a predetermined bit pattern accessed by a head, wherein the head provides a first signal upon accessing said bit pattern;

a variable gain amplifier applying a gain to the first signal provided by the head in proportion to an amplitude of the signal while reporting a first value indicative of the applied gain; and a control processor comparing the first value to a second value indicative of a second gain applied to a second signal provided by the head reading said bit pattern form the selected test track following a controlled erasure of the selected test track.

* * * * *